(12) United States Patent
Schumacher et al.

(10) Patent No.: US 8,349,072 B2
(45) Date of Patent: Jan. 8, 2013

(54) LACTATE ACTIVATED CEMENT AND ACTIVATOR COMPOSITIONS

(75) Inventors: Glenn Schumacher, Pasadena, MD (US); Rajeshkumar Patel, Catonsville, MD (US)

(73) Assignee: CeraTech, Inc., Alexandria, VA (US)

( * ) Notice: Subject to any disclaimer, the term of this patent is extended or adjusted under 35 U.S.C. 154(b) by 0 days.

(21) Appl. No.: 13/004,303

(22) Filed: Jan. 11, 2011

(65) Prior Publication Data

US 2011/0283921 A1  Nov. 24, 2011

Related U.S. Application Data

(60) Provisional application No. 61/294,017, filed on Jan. 11, 2010.

(51) Int. Cl.
*C04B 24/06* (2006.01)
*C04B 24/04* (2006.01)
*C04B 28/08* (2006.01)
*C04B 7/12* (2006.01)

(52) U.S. Cl. ........................ 106/708; 106/823

(58) Field of Classification Search .................. 106/708, 106/823
See application file for complete search history.

(56) References Cited

U.S. PATENT DOCUMENTS

| | | | |
|---|---|---|---|
| 3,144,347 | A | 8/1964 | Cowan |
| 3,856,541 | A | 12/1974 | Martin |
| 4,230,765 | A | 10/1980 | Takahashi et al. |
| 4,313,763 | A | 2/1982 | Turpin, Jr. |
| 4,798,628 | A | 1/1989 | Mills et al. |
| 4,997,484 | A | 3/1991 | Gravitt et al. |
| 5,553,670 | A | 9/1996 | Cowan |
| 5,556,458 | A | 9/1996 | Brook et al. |
| 5,605,571 | A * | 2/1997 | Buerge et al. .................. 106/808 |
| 6,641,658 | B1 | 11/2003 | Dubey |
| 7,288,148 | B2 | 10/2007 | Hicks et al. |
| 7,442,248 | B2 * | 10/2008 | Timmons ...................... 106/705 |
| 2003/0089281 | A1 | 5/2003 | Berke et al. |
| 2005/0160946 | A1 | 7/2005 | Comrie |
| 2005/0241537 | A1 | 11/2005 | Hicks et al. |
| 2005/0252420 | A1 | 11/2005 | Timmons |
| 2006/0025312 | A1 | 2/2006 | Santra et al. |
| 2008/0178770 | A1 | 7/2008 | Schumacher et al. |

FOREIGN PATENT DOCUMENTS

| | | |
|---|---|---|
| CN | 85 1 08582 | 7/1986 |
| EP | 1 344 754 | 9/2003 |
| EP | 1 380 554 | 1/2004 |

OTHER PUBLICATIONS

International Search Report and Written Opinion mailed May 7, 2008, directed at international application No. PCT/US2008/51664; 12 pages.
International Search Report and Written Opinion mailed Mar. 11, 2011, directed to counterpart application No. PCT/US11/20822; 11 pages.
Quayle Action mailed Apr. 5, 2011 directed to U.S. Appl. No. 12/017,956; 3 pages.
Extended Search Report dated May 21, 2012, directed to EP Patent Application No. 08713903.6; 7 pages.
Russian Official Action mailed Dec. 22, 2011, directed to Russian Application No. 2009131446/03(043981); 11 pages.
Patent Examination Report dated Jul. 26, 2012, directed to AU Application No. 2008206067; 4 pages.
International Preliminary Report on Patentability mailed Jul. 26, 2012, directed to International Application No. PCT/US2011/020822; 10 pages.
Office Action dated Aug. 3, 2012, directed to Chinese Application No. 200880009159.2; 28 pages.

\* cited by examiner

*Primary Examiner* — Anthony J Green
(74) *Attorney, Agent, or Firm* — Morrison & Foerster LLP

(57) ABSTRACT

Cementitious compositions in which the cementitious properties of fly ash are carefully controlled are described. The cementitious compositions may be substantially free harsh acids and bases such as citric acids (≈pH 2.2) and alkali metal activators including alkali hydroxides (≈pH 12-14) and metal carbonates (≈pH 11.6). The use of these harsh chemicals creates acid base reactions during use of the products. Instead of these harsh chemicals, a lactic acid salt based activator is be used as a reaction accelerator. Boric compounds may be used as a retarder in the compositions.

27 Claims, No Drawings

LACTATE ACTIVATED CEMENT AND ACTIVATOR COMPOSITIONS

CROSS-REFERENCE TO RELATED APPLICATIONS

This application claims the benefit of U.S. Provisional Application Ser. No. 61/294,017, filed Jan. 11, 2010, the entire content of which is incorporated herein by reference.

FIELD OF THE INVENTION

A novel family of compositions is disclosed for the production of blended hydraulic cementitious materials and their concrete and mortar derivatives for original construction, repair, manufactured concrete products, armor, spray and other applications. These materials exhibit controlled reactions of calcium-containing industrial byproducts with chemical activators, retarders, bond enhancers, and mechanical strength modifiers.

BACKGROUND OF THE INVENTION

Materials with pozzolanic properties contain vitreous silica and alumina that will, in the presence of water and free lime, react with the calcium to produce calcium silicate and calcium-alumina-silicate hydrates. There are both natural and industrial pozzolans.

Industrial pozzolans are produced during industrial processes and include, for example, Class C and Class F fly ashes as defined in accordance with American Society of Tests and Materials (ASTM) specification C618. These fly ashes are produced during the combustion of coal. They consist of the inorganic, incombustible matter present in the coal that has been fused during combustion into an amorphous structure. The classification of industrial produced fly ash depends on the type of coal used and its chemical composition. The combustion of lignite or subbituminous coal typically produces Class C fly ash. The combustion of anthracite and bituminous coal typically produces Class F fly ash.

As defined by ASTM C618, the characteristics of Class C fly ash include higher lime content than Class F fly ash. The higher lime content in Class C fly ash allows Class C fly ash to be self-hardening, while Class F fly ash typically requires the addition of lime or cement to form hydrated cementitious materials.

An example of a natural pozzolan is Class N pozzolanic ash. Class N pozzolanic ash is a raw or calcined natural pozzolan such as some diatomaceous earths, opaline cherts, and shales; tuffs, volcanic ashes, and pumicites; and calcined clays and shales.

The chemical and physical attributes of Class C, Class F and Class N pozzolanic ashes are defined by ASTM-C618, the contents of which are hereby incorporated by reference in their entirety.

It is known to use fly ash in cement compositions, typically in the presence of Portland cement. U.S. Pat. No. 5,556,458 to Brook, et al., for example, requires at least 20% Portland cement. In particular, Brook, et al. notes that Portland cement is required in their composition to overcome the low early strength of fly ash compositions.

U.S. Pat. No. 4,997,484 to Gravitt et al. and U.S. Pat. No. 7,288,148 to Hicks et al. disclose fly ash cement compositions without Portland cement, but rely on an acid-base reaction system that utilize the combined effects of citric acid (≈pH 2.2) and either an alkali hydroxide (≈pH 12-14) or metal carbonate (≈pH 11.6). However, the fly ash cement compositions of Gravitt and Hicks do not exhibit the working time, strength, durability, and hardness required by many cement applications.

U.S. patent application Ser. No. 12/017,956, the entirety of which is incorporated herein by reference, describes improved cementitious compositions comprising pozzolan powders and a pH neutral activator, and in particular, a pH neutral citric salt.

BRIEF SUMMARY OF THE INVENTION

The present invention is based on the discovery that derivatives of lactic acid, lactate and the salts of lactic acid, when used as a hydration activator of pozzolanic cements, unexpectedly and surprisingly improve the cements' plastic properties such as slump retention and workability. The improved slump retention and workability allows workers to conduct surface finishing operations to obtain desired textures without the time constraints associated with the use of citric salt activators or activators employing the salts of other longer carboxylic acids. Interestingly, not all three-carbon carboxylic acids produce the advantage of lactates. In particular, salts of proprionic acid, another three-carbon carboxylic acid, were found not to produce the improvements in retention and workabilility characterized by lactate activated cements. As described herein, a lactic acid, a lactate or the salt of lactic acid is used as the primary activator. As used herein, the phrase "chemical activator based on lactic acid" refers to lactic acid, a lactate, and salts of lactic acid, activators.

According to some preferred embodiments, the activator is an alkaline metal or alkaline earth salt of lactic acid. In addition, other forms of neutralized lactic acid may be beneficial. According to other preferred embodiments, the activator is potassium, sodium, lithium, calcium or magnesium lactate. In some embodiments, other activators may be present in the cement compositions. Preferably, the lactate activator is present in a weight percentage of at greater than 50% of the total activator content of the cement composition, more preferably 95% of the total activator content of the cement composition. Stated alternatively, non-lactate activators should be present in a total amount of less than 50% by weight, preferably less than 30% by weight, and more preferably less than 25% by weight, of the total weight of all combined activators in the cement composition.

One embodiment is a cementitious composition including coal fly ash-based pozzolans; and a chemical activator based on lactic acid. The chemical activator may be a pH neutral salt of lactic acid. For example, the chemical activator may include potassium lactate, sodium lactate, lithium lactate, calcium lactate, or magnesium lactate. The pH neutral salt may also include an alkaline metal or alkaline earth. In some embodiments, the cementitious composition may be substantially free of citric acid activators, alkali metal activators, and metal carbonate activators.

In addition, the cementitious composition may further include a chemical retarder. For example, the retarder may include a boron compound such as boric acid, boric oxide, sodium borate, sodium tetraborate, potassium borate and potassium tetraborate, borax pentahydrate, and borax decahydrate. The cement may include a borate or other retarder, for example, in an amount of 0.1 to 3.0 weight percent, based on the total weight of hydratable cement.

The cementitious composition may have a set time of between 30 minutes and 12 hours, greater than 2 hours or even than 12 hours without deleteriously affecting the ultimate performance properties, e.g. mechanical properties over a broad range of temperatures (40° F. to 120° F. Preferably, the cementitious composition has a set time of less than 24 hours.

Another embodiment is a method of forming a hardened cement composition including mixing a hydratable composition comprising coal fly ash-based pozzolans and a chemical activator based on lactic acid to form a hardened cement composition. The method can further include mixing a chemical retarder with the hydratable composition comprising coal fly ash-based pozzolans and the chemical activator. In some embodiments, the method could further include dissolving a retarder in a solution comprising the chemical activator in a concentration of between 0.1 wt % and 40 wt %, more preferably, between 0.1 wt % and 30.0 wt % and most preferably in a concentration between 10.0 wt % and 30.0 wt %. According to another embodiment the retarders and/or other compounds may be in a separate solution in other solvents at concentrations from 0.1 wt % to 50 wt %.

Lactic salt or salts may be used in combination with other known activators or a single lactic salt or a combination of lactic salts may be used as the sole activator. For example, potassium lactate may be used as the sole activator. Preferably, the non-lactate activators are present in a total amount of less than 40 wt %, and more preferably less than 25 wt %, of the total weight of all combined activators in the cementitious compositions. Boric compounds or other conventional retarders may be used in the compositions.

The cement of the invention may include any source of pozzolanic material whether naturally occurring or man made, including rice hull ash, volcanic ash pumicites, opal and other shalls, diatomaceous earths, opaline cherts, tuffs, calcined clays, Class C fly ash, Class F fly ash, Class N pozzolanic ash, either alone or in combination. The cement may also include other additives, including silica fume, calcium aluminate, magnesium oxide, lime, gypsum, one or more retarding additives from the boron compound family (for example, borate salts, boric acid, boric oxide, or borax), organic retarders such as sodium gluco-heptonate, reactive clays such as meta-kaolin, wollastonite, air entraining agents (AEA), viscosity modifying agents (VMA), plasticizers, latex, fibers (for fracture toughness), or shrinkage compensation additives (SRA). Where the primary pozzolan powder is Class F fly ash or Class N pozzolanic ash, the cement includes one or more calcium-rich materials, preferably industrial byproducts such as cement kiln dust, lime kiln dust, furnace slag and scrubber ash.

In some embodiments, the pozzolan powder may consist essentially of 100% Class C fly ash. In other embodiments, the hydratable cement may alternatively include, for example, 50 to 95 weight percent Class C fly ash based on the total weight of the hydratable cement; consist essentially of Class F fly ash and the cement may further include a calcium-rich material additive; include 0.5 to 50 weight percent Class F fly ash based on the total weight of the hydratable cement; or consist essentially of Class N pozzolanic ash and the cement may further comprises a calcium-rich material additive. According to another embodiment, the pozzolan powder consists essentially of Class C fly ash and Class F fly ash, wherein the Class C fly ash is present in an amount of 50-100 weight percent, and the Class F fly ash is present in an amount of 0-30 weight percent based on the total weight of the hydratable cement.

The disclosed cements may be used alone or blended with other cements such as Portland cement, slag cements, and other types of conventional hydraulic cements. However, the cements of the present invention do not require the presence of other cements in order to exhibit their superior properties.

Accordingly, cements according to the invention may be substantially free of Portland cement. The phrase "substantially free" means present in an amount of less than one weight percent based on the total weight of the referenced composition. The cementitious compositions may also include one or more fillers in addition to the cement. According to another embodiment, the hydratable cement may have Portland cement in amounts less than 20% by weight, and more preferably less than 15%, less than 10%, and less than 2% by weight, based on the total weight of the hydratable cement. In some embodiments, the cement may include sulfates or organic compounds.

In some embodiments, the cement compositions possess unexpectedly high dimensional stability, strength, hardness, working times, permeability, sulfate resistance, freeze-thaw resistance, mitigation of alkali-aggregate reactivity, and/or easily controlled, wide range of setting times. According to another embodiment, a mortar, grout, or concrete includes a hydraulic cement in which the cement is chemically activated by a chemical activator based on lactic acid Another embodiment is a hydratable cement that includes a pozzolan powder, one or more pH neutral activators; and a retarder, wherein the hydratable cement has a calcium content expressed as the oxides of 15% or more, preferably 20% or more, based on the total weight of the hydratable cement, and wherein the pH neutral activators account for greater that 50% of the total weight of activators in said hydratable cement and wherein the hydratable cement has less than 20% by weight Portland cement based on the total weight of the hydratable cement.

Yet another embodiment is a cementitious composition that includes a hydratable cement. The cement may include, for example, a pozzolan powder; two or more activators, at least one of which is a lactic acid salt; and a retarder; and one or more aggregate fillers. The aggregate fillers may include silica sand, natural sand, manufactured fine aggregate from stone production, bottom ash, slag, ground glass, recycled foundry sand, and recycled concrete and combinations thereof.

According to other embodiments, the hydratable cement may have alkali metal and/or alkali earth metal activators in amounts of less than 30% by weight, and more preferably less than 25% by weight, of the total weight of activators in said hydratable cement. According to other embodiments, the hydratable cement may have alkali metal and/or alkali earth metal activators in amounts less than 20% by weight, less than 15% by weight, less than 10% by weight, less than 5% by weight and less than 2% by weight, based on the total weight of activators in said hydratable cement.

DETAILED DESCRIPTION OF THE INVENTION

Prior to the present invention, it was generally believed that high temperature sintering (in the case of Portland cement) or a strong acid-base chemistry (in the case of prior art pozzolanic cements) was necessary to provide the strength and hardness required by most cement applications. Subsequent to this prevailing view, the inventors discovered that by using pH neutral activators, citric salts in particular, cement products can be produced that have unexpectedly superior properties compared to Portland cement or to pozzolanic cements prepared according to traditional acid-base activator chemistries.

Subsequent to the discovery of the advantages of citric salts as activators, the inventors discovered that lactic acid, lactates, and salts of lactic acid, when used as a hydration activator of pozzolan cements, surprisingly improve the cements' plastic properties such as slump retention and workability. As used herein, the phrase "chemical activator based on lactic acid" refers to lactic acid, lactate, and salts of lactic acid, activators.

The improved slump retention and workability allows workers to conduct surface finishing operations to obtain desired textures without the time constraints associated with the use of citric salt activators or activators employing the salts of other longer carboxylic acids. Interestingly, it was also found that not all three-carbon carboxylic acids produce the advantage of lactates. In particular, salts of proprionic acid, another three-carbon carboxylic acid, were found not to produce the improvements in retention and workability characterized by lactate activated cements.

Described are cementitious compositions in which chemical activators based on lactic acid are used as hydration activators to produce improved plastic properties such as slump retention and workability. The activators dissolve or dissociate in the presence of water and pozzolans to allow the hydration reaction with the pozzolans to proceed in a uniform, well controlled manner. Boric compounds, or other conventional retarders, may be used in the compositions to slow or modify the hydration reaction. Where citric salt activators allow for set times in ranges from as little as 10 minutes to 2 hours or more, lactic acid salt based activators of the present invention allow for set times in the range of 30 minutes to 12 hours or more without significant loss in plastic properties. One skilled in the art would understand that the compositions may be designed to have any number of desired set times including between 30 minutes and 12 hours, greater than 2 hours, greater than 4 hour and greater than 6 hours.

Embodiments of this invention may also include combinations of pozzolanic materials, for example, both Class C and Class F fly ash. The reaction of Class C fly ash can produce considerable heat, and this heat can cause early-stage shrinkage as the product is placed. This shrinkage can result in cracking and delamination from a substrate. Class F fly ash contains little or no calcium oxide (CaO), and is slowly reactive with the lactate activator. Accordingly, the inclusion of some Class F fly ash in the reaction mixture moderates the reaction forming the solid product by uniformly distributing strong, uniformly sized glass microspheres throughout the mixture. Additionally these thermal reactions are regulated by the use of the lactates. The method by which this is accomplished is by controlling the early conversion rate to the hydrated compounds. Consequently, while the total heat generated is the same, the time to achieve the hydration is broadened which allows heat dissipation to the environment in a more controlled manner.

As with cements activated with citric salts, the cement materials activated with chemical activators based on lactic acid, upon reaction with water, preferably include hydrates having silica to calcia molar ratios (S:C) of from about 1:1 to about 1.8:1, typically from about 1.1:1 to about 1.5:1. As particular examples, the S:C molar ratio may be about 1.2:1, 1.3:1 or 1.4:1. The relative amounts of calcium-containing industrial by-products (e.g., Class C fly ash) and low-calcium or siliceous industrial by-products (e.g., Class F fly ash) may be selected in order to achieve the desired S:C molar ratio.

Materials

The cements according to the present invention may include the materials set forth below, in amounts expressed in terms of weight percentage of the entire cement composition, not including sand, stone and other fillers. The term "cement" is generally used herein to refer to the binder composition. The term "cementitious composition" is generally used herein to refer to the combination of the cement (or binder) and filler, for example sand, stone, and the like. The cementitious compound typically includes from about 5 to about 60 percent cement.

1) Natural or industrial pozzolan powders. Examples of pozzolan powders include Class C fly ash, Class F fly ash, and Class N pozzolanic ash. The cementitious compounds may include Class C fly ash as a high calcium-containing pozzolan powder. In some embodiments, Class C fly ash may be included in the cement in the range of about 50 to about 98 weight percent, within the range of about 60 to about 95 weight percent, or within the range of about 70 to about 95 weight percent. Preferably, the calcium content expressed as the oxides (CaO) of the high calcium containing pozzolan powder is higher than about 22 weight percent and is in the range of about 22 to about 30 weight percent. If the CaO content is low, additional lime bearing components such as calcium hydroxide, nitrates, nitrites, sulfates or carbonates may be added. Note that although the use of Class C fly ash as the high calcium-containing pozzolan powder is primarily described herein, other types of calcium-containing pozzolan powders may be used in some embodiments as partial or total substitutes for the Class C fly ash (for example, blast furnace slag, cement kiln dust, and lime kiln dust).

The cement may additionally or alternatively include one or more relatively low calcium or high silicon containing pozzolan powders. Preferably, the cement includes at least one pozzolan powder with a calcium content expressed as the oxides of less than about 22 weight percent or, more preferably, less than about 15 weight percent. In some embodiments, Class F fly ash may, for example, be present in the range of about 0.5 to about 50 weight percent, or preferably within the range of about 1 to about 25 weight percent, or more preferably within the range of about 2 to about 15 weight percent. Although the use of Class F fly ash as the low-calcium pozzolan powder is primarily described herein, other types of relatively low calcium and/or high silicon pozzolan powders may be used in some embodiments as partial or total substitutes for the Class F fly ash (for example, Class N pozzolanic ash, volcanic ash, bottom ash, wood ash, municipal incinerator ash, zeolites etc.) To the extent that low calcium content pozzolanic powders comprise a large proportion of the pozzolanic powder component, calcium-rich materials must be added to the composition to provide the required calcium content. Preferred calcium-rich materials include industrial byproducts such as blast furnace slag, cement kiln dust, lime kiln dust and scrubber ash.

Silica fume may be used in the cement to increase short term strength, long term strength, bond strength, elastic properties and/or thermal properties. When present, silica fume may be present, for example, in the range of about 0.5 to about 10 weight percent, or preferably within the range of about 1 to about 7 weight percent.

Preferably, the cement comprises a total calcium content expressed as the oxides of 20 weight percent or more. If the CaO content is low, additional lime bearing components such as calcium hydroxide, nitrate, nitrite, sulfate or carbonate may be added to achieve this calcium content.

Calcium aluminate may be used to increase the short-term strength development of the product. Calcium aluminate may, for example, be present in the range of about 1 to about 25 weight percent, or within the range of about 5 to about 20 weight percent.

Lime (CaO or CaOH) additions can be used to enhance product workability, act as a shrinkage compensator, and/or function as an accelerator Lime may, for example, be present in the range of about 0.1 to about 5 weight percent. The amount of lime added to the composition may be dependent upon the amount of lime present in the fly ash.

Borates may be used as strength gain retarders. Preferred borates include one or more retarding additives from the borate salt family, for example, borax may be present in the range of about 0.1 to about 10 weight percent, or preferably 0.1 to 3 weight percent, or more preferably from 0.1 to about 2 weight percent. Boric acid may also or alternatively be used as the borate may, for example, be present in the range of about 0.1 to about 10 weight percent, or preferably within the range of about 0.1 to 5 weight percent or more preferably within the range of about 0.2 to about 1.7 weight percent. Other borates such as boric acid, potassium borate, sodium borate, potassium tetraborate and sodium tetraborate hydrates may additionally or alternatively be used. These borates may be added to increase bond strength to the existing substrate as and is a retarder. Other known retarders including sulfates and organic compounds can be used in addition or as an alternative to the borates.

A single or multiple activators from the lactic acid family may be included. For example, lactic acid, lactate, potassium lactate, lithium lactate, sodium lactate, calcium lactate or magnesium lactate may, for example, be present in the range of about 0.1 to about 30 weight percent, compared to the total weight of the cement, or preferably from about 2 to about 5 weight percent, compared to the total weight of the cement. These activators may be the only activators present in the cement. Alternatively, other non-lactate activators may be present, provided that lactate activators make up 50% or more of the activator component.

Other examples of pH neutral activators that may be used in place of or in addition to a lactate activator include citric salts, malic, malonic, glycolic, and other carboxylic acids and salts of these acids, including but not limited to nitrates, nitrites, chlorides, thiocyanates.

Miscellaneous ingredients including, for example, reactive clays such as meta-kaolin, wollastonite, air entraining agents (AEA), latex, fibers (for fracture toughness), shrinkage compensators (SRA), viscosity modifying agent (VMA) and plasticizers.

In some embodiments, the cements of the present invention are substantially free of Portland cement, slag cements, and other types of conventional cements. In other embodiments, the cements of the invention may include other cements, including Portland cement, provided that such other cements comprise less than about 20 weight percent, preferably less than about 15 weight percent, and more preferably less than 10 weight percent, of the total weight of the cement.

Embodiments may also or alternatively be substantially free of alkali metal activators such as alkali hydroxides (≈pH 12-14) and metal carbonates (≈pH 11.6) as used in other types of materials. Embodiments may also or alternatively be substantially free of citric acids (≈pH 2.2) and or other acids.

Cementitious compositions according to the invention may include one or more fillers in addition to the cement. According to some embodiments, the fine aggregate (sand) particle sizes can range from fine silica sand to naturally or manufactured sand to conform to ASTM specifications. These fillers may include, for example, silica sand, natural sand, manufactured fine aggregate from stone production, bottom ash, slag, ground glass, recycled concrete and/or recycled foundry sands. Specific examples of fillers include different aggregate gradations, such as C33 sand, NJ 60 sand, C144 sand, #8 stone, and #57 stone or others.

This invention will be better understood with reference to the following examples, which are intended to illustrate specific embodiments within the overall scope of the invention.

EXAMPLES

Tables 1a and 1b provide examples of cement mixtures using a lactate activator. Table 1a lists mixtures made at 95° F. and utilizing a lactate activator at 72° F. Table 1b lists mixtures made at 72° F. In Tables 1a and 1b the proportions of materials used in the mortar compositions are; cement 6.91 lb (including activator), C33 Sand 10.80 lb, water 1.59 lb. These proportions are mixed for 4 minutes and then the samples were prepared. The mortars tested had following approximate composition:

| | |
|---|---|
| Class C fly ash | ~27.11 wt % |
| Class F fly ash | ~4.13 wt % |
| Retarder | 0.4 wt % to 1.25 wt % |
| Activator | 3.2 wt % to 10.0 wt % |
| C33 sand | 66.7 wt % |
| Total | 100.00 wt % |

The total of the class c plus the class f fly ash is adjusted to account for differences in the amount of activator/retarder.

In these tables, the weight percentages for different activator and retarder compositions are provided. The lactate activator is comprised of a 60 wt % solids solution of neutralized lactic acid. The salt is a potassium based salt. The retarder is a single source of technical grade boric acid available from Rio Tinto Corporation.

The ability of these lactate mixtures to retain slump can be seen in Tables 1a and 1b. The percentage of activator and retarder are based upon the percentage of class C fly ash in the mixture. In Tables 1a and 1b, the effects of the lactate to the retention of working time in mortars and concrete as determined in accordance with ASTM C 403 are shown. The flow retention time was greater than 2 hours (working time), and was measured by measuring the slump retention and placement time for each composition. The final set time was from 2 hours to over 9 hours and was measure by penetration resistance according to ASTM C403. The strength of the cement mixtures in psi are provided at 6 hours, 8 hours, 24 hours, 7 days, and 28 days.

Variations to both the activator (potassium lactate) and of the retarder were evaluated at different temperatures to determine what effect, if any, to the slump or flow retention would occur. From this, it is possible to formulate the cement to achieve desired properties.

TABLE 1a

Cement Mixtures Made at 95° F.-Lactate Activator at 72° F.

| Mix ID | Description of mix | Flow Retention Time, Min | Final set time, Min | 6 Hours | 8 Hours | 24 Hours | 7 Days | 28 Days |
|---|---|---|---|---|---|---|---|---|
| 1 | Lactate activator 5.8% liquid (4.35% solid), Retarder 1.25%. Lab made Lactate activator | 217 | 480 | 0 | 0 | 4387 | 6863 | 8775 |
| 2 | Lactate activator 5.8% liquid (4.35% solid), No Retarder acid (0%) Lab made Lactate activator | Flash set | Flash Set | No samples made | | | | |
| 3 | Lactate activator 6.33% liquid (3.8% solid), Retarder 1.12%. | 205 | 380 | 0 | 1041 | 4545 | 5982 | 8676 |
| 4 | Lactate activator 6.33% liquid (3.8% solid), Retarder 1.00%. | 150 | 270 | 0 | 1917 | 4388 | 7167 | 8787 |
| 5 | Lactate activator 6.33% liquid (3.8% solid), Retarder 0.8%. | 100 | 131 | 0 | 2448 | 4207 | 6503 | 7859 |
| 6 | Lactate activator 6.33% liquid (3.8% solid), Retarder 0.6%. | 28 | 35 | 2121 | 2462 | 3319 | 5922 | |
| 7 | Lactate activator 6.33% liquid (3.8% solid), Retarder 0.4%. | 6 | 12 | 2354 | 2629 | 3774 | 6006 | |
| 8 | Lactate activator 3.33% liquid (2% solid), Retarder 1.0% | 230 | 600 | 0 | 0 | 4493 | 7253 | 8981 |
| 9 | Lactate activator 5% liquid (3% solid), Retarder 1.0% | 220 | 373 | 0 | 966 | 4567 | 7748 | 8238 |
| 10 | Lactate activator 6.33% liquid (3.8% solid), Retarder 1.00%. | 150 | 270 | 0 | 1917 | 4388 | 7167 | 8787 |
| 11 | Lactate activator 8.33% liquid (5% solid), Retarder 1.0% | 120 | 133 | 2035 | 2676 | 4296 | 6576 | |
| 12 | Lactate activator 10% liquid (6% solid), Retarder 1.0% | 70 | 91 | 2240 | 2871 | 3948 | 5995 | |

TABLE 1b

Cement Mixtures Made at 72° F.-Lactate Activator at 72° F.

| Mix ID | Description of mix | Flow Retention Time, Min | Final set time, Min | 6 Hours | 8 Hours | 24 Hours | 7 Days | 28 Days |
|---|---|---|---|---|---|---|---|---|
| 13 | Lactate activator 3.33% liquid (2% solid), Retarder 1.0% | 360 | >540 | 0 | 0 | 1913 | 7833 | 8783 |
| 14 | Lactate activator 5% liquid (3% solid), Retarder 1.0% | 300 | 498 | 0 | 0 | 3353 | 6184 | 8667 |
| 15 | Lactate activator 6.33% liquid (3.8% solid), Retarder 1.00%. | 240 | 352 | 0 | 723 | 3681 | 6877 | 9182 |
| 16 | Lactate activator 8.33% liquid (5.0% solid), Retarder 1.00%. | 180 | 225 | 547 | 919 | 3541 | 6605 | |
| 17 | Lactate activator 10% liquid (6.0% solid), Retarder 1.00%. | 70 | 130 | 858 | 1315 | 3493 | 5863 | |
| | Variation of Retarder | | | | | | | |
| 18 | Lactate activator 6.33% liquid (3.8% solid), Retarder 1.00%. | 240 | 352 | 0 | 723 | 3681 | 6877 | 9182 |
| 19 | Lactate activator 6.33% liquid (3.8% solid), Retarder 0.8%. | 160 | 176 | 845 | 1680 | 3498 | 6519 | |
| 20 | Lactate activator 6.33% liquid (3.8% solid), Retarder 0.6%. | 38 | 48 | 1630 | 1939 | 3363 | 5750 | |
| 21 | Lactate activator 6.33% liquid (3.8% solid), Retarder 0.4%. | 8 | 16 | 1618 | 1876 | 2944 | 5098 | |

Various concrete mixtures made with a lactate activator can be found in Table 2. It can be seen that the workability of the concrete is maintained without loss of slump up to the setting time. These concretes were produced at different temperatures and targeted different working times.

TABLE 2

Concrete mixtures made with lactate activators

| Example # | 1 | 2 | 3 | 4 | 5 | 6 | 7 | 8 |
|---|---|---|---|---|---|---|---|---|
| Pozzolan A (%) | 17.482 | 15.783 | 15.783 | 15.783 | 15.783 | 15.783 | 15.783 | 15.783 |
| Pozzolan B (%) | 2.995 | 2.704 | 2.704 | 2.704 | 2.704 | 2.704 | 2.704 | 2.704 |
| Retarder (%) | 0.140 | 0.139 | 0.153 | 0.167 | 0.181 | 0.139 | 0.144 | 0.149 |
| Lactate (%) | 1.108 | 1.131 | 1.131 | 1.131 | 1.131 | 1.131 | 1.131 | 1.131 |
| SRA (%) | 0.153 | 0.115 | 0.115 | 0.115 | 0.115 | 0.000 | 0.115 | 0.115 |
| C 33 Sand (%) | 25.397 | 30.224 | 30.224 | 30.224 | 30.224 | 30.224 | 30.224 | 30.224 |
| #57 Stone (%) | 50.614 | 50.892 | 50.892 | 50.892 | 50.892 | 50.892 | 50.892 | 50.892 |
| Percent water | 4.666 | 3.364 | 3.363 | 3.542 | 3.362 | 3.602 | 3.370 | 3.370 |
| Mix temp | 50 | 70 | 70 | 70 | 70 | 70 | 70 | 70 |
| Slump | 4 | 4 | 3.75 | 6 | 4 | 6 | 4 | 3 |
| Place time | | | 4:24 | 8:09 | 9:00 | | | |
| Work time | | 2:01 | 5:02 | 8:30 | | 3:15 | 2:45 | 3:14 |
| Set time | 1:00 missed | 2:30 | 5:56 | >9:08 | >9:19 | 3:56 | 3:01 | 4:29 |
| Comments | | | bleed water | bleed water | bleed water | | | |
| Strength | | | | | | | | |
| 4 hours | | 395 | | | | | | |
| 5 hours | | | | | | 330 | 450 | |
| 6 hours | 824 | 550 | | | | 460 | 510 | 370 |
| 7 hours | | | | | | 580 | 610 | 430 |
| 8 hours | | 575 | 485 | | | | | |
| 10 hours | | | 580 | | | | | |
| 24 hours | 1790 | 1800 | 1550 | 1180 | 1360 | 1800 | 1640 | 1490 |
| 48 hours | | 3280 | 2970 | 2610 | 3060 | 3150 | 3160 | 2960 |
| 3 days | 2870 | 3940 | 3780 | 3740 | 3910 | | | |
| 5 days | | | | | | 4850 | 4620 | 4910 |
| 7 days | 3660 | 5190 | 5180 | 4970 | 5180 | 5280 | 5020 | 5000 |
| 28 days | | 6240 | 6090 | 6350 | 6600 | 6330 | 6250 | 6260 |

Table 3 shows the performance of a cement design with respect to various concrete designs. In these examples the cement formulation is as follows;

| | |
|---|---|
| Pozzolan A (Class C fly ash) wt % | 82.08 |
| Pozzolan B (Class F fly ash) wt % | 13.90 |
| Retarder (Boric Acid) wt % | 0.903, |
| Activator (Potassium Lactate 60% solids) wt % | 3.119 |

TABLE 3

Strength and Durability Results for Lactate Based Concrete

| Mix Category | | General Use Concrete | | |
|---|---|---|---|---|
| Mix # | | 1 | 2 | 3 |
| Binder Content/cy | | 600 lbs/cy | 750 lbs/cy | 900 lbs/cy |
| Strength | 24 H | 1120 | 2222 | 2424 |
| | 7 D | 3374 | 5453 | 5899 |
| | 28 D | 4831 | 6798 | 7310 |
| Flex Strength | 24 H | 188 | 244 | 291 |
| | 7 D | 450 | 563 | 562 |
| | 28 D | 553 | 647 | 685 |
| Split Tensile | 24 H | 181 | 307 | 371 |
| | 7 D | 439 | 481 | 625 |
| | 28 D | 658 | 669 | 660 |
| MOE, Million psi | 24 H | 2.42 | 2.92 | 2.58 |
| | 7 D | 4.96 | 4.89 | 4.81 |
| | 28 D | 5.52 | 5.24 | 5.18 |

Similarly, concretes can be made with an activator already having the retarder pre-incorporated into the activator solution. These have demonstrated similarly enhanced plastic properties. This in some instances provides a convenience for production of concretes at remote locations without pre-blending all the components. Examples of activators made in this way can be found in Table 4.

TABLE 4

Activator Compositions Including a Retarder

| | Percent | | | | |
|---|---|---|---|---|---|
| Component | 1 | 2 | 3 | 4 | 5 |
| Boric acid | | | 18.0 | 18.0 | 25.0 |
| Potassium lactate | 95.0 | 89.1 | 82.0 | | 75.0 |

TABLE 4-continued

Activator Compositions Including a Retarder

| Component | Percent | | | | |
|---|---|---|---|---|---|
| | 1 | 2 | 3 | 4 | 5 |
| Potassium hydroxide | | | | 32.8 | |
| Lactic acid | | | | 49.2 | |

Table 5 shows the volume stability of concretes made with the lactate activated cement. Their concrete design proportions are those shown in Table 3.

TABLE 5

ASTM C156 Shrinkage Values for Concretes in Table 1a

| Sample # | 1 | 2 | 3 | 4 | 5 | 7 | 8 |
|---|---|---|---|---|---|---|---|
| 1 day | −0.001 | −0.006 | −0.003 | −0.003 | −0.003 | −0.006 | −0.006 |
| 2 day | −0.009 | −0.010 | | | −0.011 | −0.009 | −0.009 |
| 3 day | −0.016 | −0.012 | −0.005 | −0.007 | | −0.011 | |
| 7 day | −0.020 | −0.018 | −0.014 | −0.015 | −0.021 | −0.021 | −0.020 |
| 14 day | −0.024 | −0.022 | −0.019 | −0.024 | −0.028 | −0.025 | −0.025 |
| 28 day | −0.029 | −0.028 | −0.024 | −0.029 | −0.030 | −0.027 | −0.029 |

Manufacturing Methods

The large area products (such as Example 4 in Table 2) may be produced by mixing all the ingredients except for the activator prior to use. The activator may then be added at the time when you need the concrete to initiate its reaction. Once the activator is added, the chemical reaction leading to final set has been started. The specific blend will determine how much working time is available prior to the final set.

For example, a transit truck may load a mix according to Example 4 at a batch plant. The transit truck now has 4-6 hours or more before the concrete will no longer be useable. At any point in that time period, the activator, as a liquid or as a solid power, may be added (most likely at the construction site), and the concrete may be placed. This ability provides a huge advantage over Portland cement concrete, which typically has 90 minutes of acceptable working time from the moment the transit truck is loaded at the batch plant. Examples of concrete produced in this way are show in table 6.

TABLE 6

General Use Concrete (Lactate based activator) Strength Curves for Different Binders

| Mix ID | Data | Final Set Min | Compressive strength | | | |
|---|---|---|---|---|---|---|
| | | | 24 H | 3 D | 7 D | 28 D |
| 8142 | ekkomaxx concrete Pot Lactate 3.119%, Boric acid 0.9028%, Binder 500 lbs/cy, W/C 0.400 | 7 H: 30 M | 336 | 1670 | 2222 | 3102 |
| 8143 | ekkomaxx Concrete with Pot Lactate 3.119%, Boric acid 0.9028%, Binder 550 lbs/cy, W/C 0.349 | 7 H: 45 M | 435 | 2113 | 3020 | 3797 |
| 8144 | ekkomaxx concrete with Pot Lactate 3.119%, Boric acid 0.9028%, Binder 600 lbs/cy, W/C 0.3155 | 8 H | 665 | 2790 | 3829 | 5080 |
| 8149 | ekkomaxx concrete with Pot Lactate 3.119% Boric acid 0.9028%, Binder 650 lbs/cy, W/C 0.2645 | 10 H: 30 M | 958 | 4386 | 5000 | 6105 |
| 8150 | ekkomaxx concrete with Pot Lactate 3.119%, Boric acid 0.9028%, Binder 700 lbs/cy, W/C 0.2464 | 10 H: 45 M | 1339 | 4911 | 5877 | 6911 |
| 8151 | ekkomaxx concrete with Pot Lactate 3.119%, Boric acid 0.9028%, Binder 750 lbs/cy, W/C 0.2227 | 11 H | 1415 | 5032 | 6205 | 7439 |
| 8157 | ekkomaxx concrete with Pot Lactate 3.119%, Boric acid 0.9028%, Binder 800 lbs/cy, W/C 0.2096 | 10 H: 15 M | 2308 | 5707 | 6990 | 7776 |
| 8158 | ekkomaxx concrete with Pot Lactate 3.119%, Boric acid 0.9028%, Binder 850 lbs/cy, W/C | 10 H | 2453 | 5832 | 7066 | 8059 |
| 8159 | ekkomaxx concrete with Pot Lactate 3.119%, Boric acid 0.9028%, Binder 900 lbs/cy, W/C 0.192 | 10 H | 2692 | 6213 | 7259 | 8391 |

The volumetric mixable products (for example, Examples 5 and 7 in Table 2) may be made by adding uniform portions of cement, stone, and sand under remote control operation. The cement portion containing both the accelerator and the retarder may be blended with sand and stone in the high shear mixer. As an option to this approach, the accelerant and retarder may be added in either powder or liquid form.

This application discloses several numerical ranges in the text and figures. The numerical ranges disclosed inherently support any range or value within the disclosed numerical ranges even though a precise range limitation is not stated verbatim in the specification because this invention can be practiced throughout the disclosed numerical ranges.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. Finally, the entire disclosure of the patents and publications referred in this application are hereby incorporated herein by reference.

What is claimed is:

1. A cementitious composition comprising:
   coal fly ash-based pozzolans; and
   a chemical activator based on lactic acid comprising more than 50% by weight of the total weight of activators in the cementitious composition,
   wherein the total weight of activators in the cementitious composition comprises 0.1 to 30% of the total weight of the cementitious composition, and the cementitious composition is substantially free of Portland cement.

2. The cementitious composition of claim 1, wherein the chemical activator is a pH neutral salt of lactic acid.

3. The cementitious composition of claim 2, wherein the chemical activator comprises potassium lactate, sodium lactate, lithium lactate, calcium lactate, or magnesium lactate.

4. The cementitious composition of claim 2, wherein the pH neutral salt comprises an alkaline metal or alkaline earth.

5. The cementitious composition of claim 1, wherein cementitious composition further comprises a chemical retarder.

6. The cementitious composition of claim 5, wherein the retarder comprises a boron compound.

7. The cementitious composition of claim 6, wherein the boron compound is selected from the group consisting of boric acid, boric oxide, sodium borate, sodium tetraborate, potassium borate and potassium tetraborate, borax pentahydrate, and borax decahydrate.

8. The cementitious composition of claim 1, wherein cementitious composition is substantially free of citric acid activators, alkali metal activators, and metal carbonate activators.

9. The cementitious composition of claim 1, wherein the chemical activator based on lactic acid comprises more than 95% by weight of the total weight of activators in the cementitous composition.

10. The cementitious composition of claim 1, wherein the cementitous composition has a set time of between 2 hours and 24 hours.

11. The cementitious composition of claim 1, coal fly ash based pozzolans are selected from the group consisting of Class C fly-ash, Class F fly-ash, Class N pozzolanic ash and combinations thereof.

12. The cementitious composition of claim 10, wherein the composition has a silica to calcia molar ratio of between about 1.2:1 and about 1.4:1.

13. The cementitious composition of claim 5, wherein the retarder is dissolved in a solution of activator in a concentration between 0.1% and 30.0%.

14. The cementitious composition of claim 5, wherein the retarder is dissolved in a solution of activator in a concentration between 10.0% and 30.0%.

15. A method of forming a hardened cement composition comprising:
mixing a hydratable composition comprising coal fly ash-based pozzolans and
a chemical activator based on lactic acid comprising more than 50% by weight of the total weight of activators in the cementitious composition, to form a hardened cement composition,
wherein the total weight of activators in the cementitious composition comprises 0.1 to 30% of the total weight of the cementitious composition, and the cementitious composition is substantially free of Portland cement.

16. The method of claim 15, wherein the chemical activator is a pH neutral salt of lactic acid.

17. The method of claim 15, wherein the chemical activator comprises potassium lactate, sodium lactate, lithium lactate, calcium lactate, or magnesium lactate.

18. The method of claim 16, wherein the pH neutral salt comprises an alkaline metal or alkaline earth.

19. The method of claim 15, further comprising mixing a chemical retarder with the hydratable composition comprising coal fly ash-based pozzolans and the chemical activator.

20. The method of claim 19, wherein the retarder comprises a boron compound.

21. The method of claim 20, wherein the boron compound is selected from the group consisting of boric acid, boric oxide, sodium borate, sodium tetraborate, potassium borate and potassium tetraborate, borax pentahydrate, and borax decahydrate.

22. The method of claim 15, wherein citric acid activators, alkali metal activators, and metal carbonate activators are not mixed with the hydratable composition comprising coal fly ash-based pozzolans to form the hardened cement composition.

23. The method of claim 15, wherein the chemical activator based on lactic acid comprises more than 95% by weight of the total weight of activators used to form the hardened cement composition.

24. The method of claim 15, wherein the hydratable composition comprising coal fly ash-based pozzolans has a set time of greater than 2 hours after mixing with the chemical activator based on lactic acid.

25. The method of claim 15, wherein the hydratable composition comprising coal fly ash-based pozzolans comprises pozzolans selected from the group consisting of Class C fly-ash, Class F fly-ash, Class N pozzolanic ash and combinations thereof.

26. The method of claim 15, further comprising dissolving a retarder in a solution comprising the chemical activator in a concentration of between 0.1% and 40%.

27. The method of claim 15, further comprising dissolving a retarder in a solution separate from the chemical activator in a concentration of between 0.1% and 40%.

* * * * *